(12) United States Patent
Kulkarni et al.

(10) Patent No.: US 7,895,475 B2
(45) Date of Patent: Feb. 22, 2011

(54) SYSTEM AND METHOD FOR PROVIDING AN INSTRUMENTATION SERVICE USING DYE INJECTION AND FILTERING IN A SIP APPLICATION SERVER ENVIRONMENT

(75) Inventors: Mihir Arvind Kulkarni, Fremont, CA (US); Rajendra Inamdar, N. Chelmsford, MA (US); Rao Nasir Khan, Fremont, CA (US); Jaroslaw Wilkiewicz, Menlo Park, CA (US); Paul James Devine, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 11/943,925

(22) Filed: Nov. 21, 2007

(65) Prior Publication Data

US 2009/0019312 A1 Jan. 15, 2009

Related U.S. Application Data

(60) Provisional application No. 60/949,131, filed on Jul. 11, 2007.

(51) Int. Cl.
*G06F 11/00* (2006.01)
(52) U.S. Cl. .............................. 714/47; 714/25; 714/38
(58) Field of Classification Search ................... 714/25, 714/27, 32, 33, 37, 38, 39, 45, 47, 51
See application file for complete search history.

(56) References Cited

U.S. PATENT DOCUMENTS

| | | | |
|---|---|---|---|
| 3,647,971 A | 3/1972 | Cushman et al. |
| 4,060,716 A | 11/1977 | Pekrul et al. |
| 4,481,577 A | 11/1984 | Forson |
| 4,943,919 A | 7/1990 | Aslin et al. |
| 6,052,724 A | 4/2000 | Willie et al. |
| 6,061,507 A | 5/2000 | Fitzgerald et al. |
| 6,298,454 B1 | 10/2001 | Schleiss et al. |
| 6,338,148 B1 | 1/2002 | Gillenwater et al. |
| 6,480,862 B1 | 11/2002 | Gall |
| 6,492,904 B2 | 12/2002 | Richards |

(Continued)

FOREIGN PATENT DOCUMENTS

DE 4302908 3/1994

(Continued)

*Primary Examiner*—Robert Beausoliel
*Assistant Examiner*—Joseph D Manoskey
(74) *Attorney, Agent, or Firm*—Fliesler Meyer LLP

(57) ABSTRACT

An instrumentation service is described that uses dye injection and filtering in a Session Initiation Protocol (SIP) application server environment. The instrumentation service can provide a flexible mechanism for selectively adding diagnostic code to the SIP application server and the various applications running on it. It can allow flexible selection of locations in the server and application code, at which instrumentation code can be added. The process of adding diagnostic code can be deferred to the time of running the server at the deployment site. The instrumentation service further allows flexible selection of diagnostic actions, which can be executed at selected locations. In various embodiments, the execution of diagnostic code can be dynamically enabled or disabled while the server is running. Also, the behavior of diagnostic code executed at such locations can be dynamically changed while the server is running.

19 Claims, 8 Drawing Sheets

U.S. PATENT DOCUMENTS

| | | | |
|---|---|---|---|
| 6,553,515 B1 * | 4/2003 | Gross et al. | 714/47 |
| 2002/0053045 A1 | 5/2002 | Gillenwater et al. | |
| 2002/0073404 A1 | 6/2002 | Sokolov et al. | |
| 2003/0052776 A1 | 3/2003 | Richards | |
| 2003/0093695 A1 | 5/2003 | Dutta | |
| 2003/0163729 A1 | 8/2003 | Buchegger | |
| 2003/0216889 A1 | 11/2003 | Marko | |
| 2003/0229691 A1 | 12/2003 | Ishimoto | |
| 2004/0002881 A1 | 1/2004 | Hu et al. | |
| 2004/0168162 A1 | 8/2004 | Park et al. | |
| 2004/0225689 A1 | 11/2004 | Dettinger et al. | |
| 2004/0267882 A1 | 12/2004 | Whynot et al. | |
| 2005/0046583 A1 | 3/2005 | Richards | |
| 2005/0203994 A1 | 9/2005 | Palmer et al. | |
| 2005/0237999 A1 | 10/2005 | Shores et al. | |
| 2005/0261875 A1 | 11/2005 | Shrivastava et al. | |
| 2005/0261878 A1 | 11/2005 | Shrivastava et al. | |
| 2005/0261879 A1 | 11/2005 | Shrivastava et al. | |
| 2005/0273490 A1 | 12/2005 | Shrivastava et al. | |
| 2005/0273667 A1 | 12/2005 | Shrivastava et al. | |
| 2006/0010224 A1 | 1/2006 | Sekar et al. | |
| 2006/0238348 A1 | 10/2006 | Richards | |
| 2007/0300296 A1 * | 12/2007 | Kudla et al. | 726/13 |
| 2008/0021939 A1 | 1/2008 | Dahlstedt et al. | |
| 2008/0062997 A1 * | 3/2008 | Nix | 370/395.2 |

FOREIGN PATENT DOCUMENTS

| | | |
|---|---|---|
| EP | 0028167 | 5/1981 |
| JP | 359121556 | 7/1984 |
| JP | 406281684 | 10/1994 |
| JP | 2003256036 | 9/2003 |

* cited by examiner

SYSTEM AND METHOD FOR PROVIDING AN INSTRUMENTATION SERVICE USING DYE INJECTION AND FILTERING IN A SIP APPLICATION SERVER ENVIRONMENT

CLAIM OF PRIORITY

The present application claims the benefit of U.S. Provisional Patent Application No. 60/949,131, entitled SYSTEM AND METHOD FOR PROVIDING AN INSTRUMENTATION SERVICE USING DYE INJECTION AND FILTERING IN A SIP APPLICATION SERVER ENVIRONMENT, by Mihir Arvind Kulkarni et al., filed on Jul. 11, 2007, which is incorporated herein by reference in its entirety.

CROSS REFERENCE TO RELATED APPLICATIONS

The following commonly owned, co-pending United States patents and patent applications, including the present application, are related to each other. Each of the other patents/applications are incorporated by reference herein in their entirety:

U.S. patent application Ser. No. 11/133,633, entitled DIAGNOSTIC INSTRUMENTATION by Sandeep Shrivastava, et al., filed on May 20, 2005;

U.S. patent application Ser. No. 11/545,671, entitled SIP SERVER ARCHITECTURE FOR IMPROVING LATENCY IN MESSAGE PROCESSING by Anno R. Langen, et al., filed on Oct. 10, 2006;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to telecommunication application servers and more particularly to instrumentation of code by dye injection and filtering.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be complex and rigid for allowing the creation and deployment of new service offerings.

The session initiation protocol (SIP) has helped in standardizing the communications and signaling between various clients in public switched telephone network (PSTN). SIP is an application-level protocol that specifies the creation, establishment, modifying and termination of sessions between two or more clients. A specification of the SIP protocol can be found at RFC 3261 available from the IETF SIP Working Group, which is hereby incorporated herein by reference in its entirety.

A number of SIP application servers have emerged, which allow deployment of various enhancements and services that are focused on telecommunications and voice over internet protocol (VoiP) networks. These SIP application servers allow various applications and services to be developed, which implement the SIP protocol as well as converged applications which may span other protocols, such as the hypertext transfer protocol (HTTP). One such SIP application server is the WebLogic® SIP Server, available from BEA Systems Inc.

However, development and deployment of such SIP applications has introduced a number of issues and concerns different from and not previously found with other protocols, such as HTTP. For example, the number and manner of communications in SIP has made it desirable for other management algorithms, infrastructures and techniques for optimizing latency, reducing errors and obtaining various other advantages.

Notably, the methodologies for testing, diagnosis, debugging and instrumentation of programming language code can be significantly improved to allow better detection and correction of errors or bugs within SIP applications. For example, due to a high number of messages and requests processed in a typical SIP application server deployment, highly specific and localized errors can be difficult to trace. Monitoring all incoming or outgoing traffic can be system resource-intensive and burdensome in an environment that is typically already latency-sensitive. Furthermore, generating very large volumes of diagnostic information may not always be helpful in determining the problem, due to the difficulties in sorting and searching through all of the data.

As an illustration, tracking down a bug that affects only one or a few clients in the system can be highly difficult because of the thousands or even millions of messages being processed by the SIP application servers at any given time. If information for all of this message traffic were to be inspected, such data would be too large and unmanageable to provide any significant benefit. Furthermore, performing diagnostics actions for every incoming message can cause significant latency which is also undesirable in the SIP application server environment.

In light of the foregoing and other difficulties identified by the applicants, a system is desirable for providing an instrumentation service to various applications, which can enable selectively performing diagnostic actions only on requests that match particular criteria, keep the volume of generated diagnostic information to a manageable level, allow diagnosis of selected requests without slowing down other request processing in the system, and provide rich, detailed and relevant information about selected messages. Other advantages of such a system will also be apparent upon review of the following description, figures and claims.

DETAILED DESCRIPTION

Figure 1:
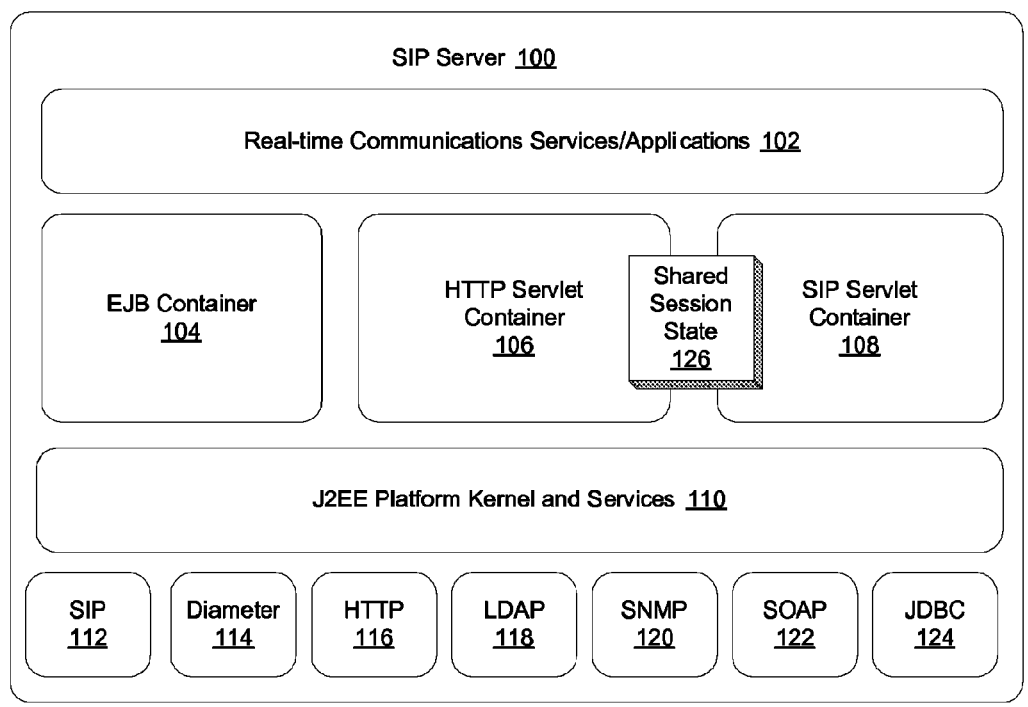
FIG. 1 is a general illustration of a SIP Server and its components, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for providing an instrumentation service using dye injection and filtering in a session initiation protocol (SIP) application server environment. The instrumentation service can provide a flexible mechanism for selectively adding diagnostic code to the SIP application server and the various applications running on it. It can allow flexible selection of locations in the server and application code, at which instrumentation code can be added. In one embodiment, the process of adding diagnostic code is deferred to the time of running the server at the deployment site. The instrumentation service further allows flexible selection of diagnostic actions, which can be executed at selected locations. In various embodiments, the execution of diagnostic code can be dynamically enabled or disabled while the server is running. Also, the behavior of diagnostic code executed at such locations can be dynamically changed while the server is running.

In various embodiments, a set of diagnostic monitors can be provided to a SIP application server in order to enable the instrumentation service. In one embodiment, a diagnostic monitor is a manageable unit of diagnostic code which can be applied to specific points in the program flow (pointcuts). For example, a dye injection monitor can be configured at the server scope and weaved into specific server classes at build time. This dye injection monitor can then be used to inject dye into requests incoming to (or outgoing from) the application server. Other diagnostic monitors can also be configured at the application scope and weaved into the application classes at load time.

Event collection can be accomplished by designating key points in the application flow and then monitoring requests that pass through those points. In certain embodiments, it is also preferable to capture events only for a single (or a selected few) request coming from a single client (or few clients). In other words, rather than monitoring all incoming message traffic, it is sometimes advantageous to obtain information about a specific message or messages from a specific client, and the like. The dye filtering mechanism allows keeping the volume information collected to a minimum and further allows for easy isolation of events. In one embodiment, the instrumentation service allows an administrator or developer to mark or dye a particular request in such a way that the SIP server diagnostics can determine whether it should be monitored. For example, the SIP server can inject dye into a particular request by setting flags in the diagnostic context. Subsequently, during the processing of this request, a corresponding monitor that matches the flag can be invoked in order to perform various actions. For example, by using the dye filtering feature, the server can be configured to monitor requests coming from a particular internet protocol (IP) address and log or print data regarding these requests upon processing them.

In various embodiments, a joinpoint refers to a well defined point in the program flow and a pointcut refers a well defined set of joinpoints, typically identified by some generic expressions. The instrumentation can have a particular scope, such as server-scope or application-scope. The diagnostic monitors can have one or more actions associated therewith, which specify the diagnostic activities that will take place at the pointcuts defined the respective monitor. For example, an action can trace a request, display the arguments, trace elapsed time of the request, dump the stack, dump the thread information, log various data and the like.

In one embodiment, there can be three types of diagnostic monitors—standard, delegating and custom. A standard monitor can have a fixed pointcut and a fixed action that is executed at this pointcut. A delegating monitor can have a fixed pointcut, but the action can be configurable by the administrator. A custom diagnostic monitor, on the other hand, can have both a configurable pointcut and configurable action(s) to be performed.

In one embodiment, a dye injection monitor can be integrated with the SIP application server. This monitor can be responsible for injecting dye into the diagnostic context when requests enter (or leave) the system. It can apply to pointcuts which identify code in the server classes, which handle incoming messages. When enabled, the dye injection monitor can set dye flags in the diagnostic context based on its configuration properties and request attributes. In various embodiments, a diagnostic context can contain the metadata associated with the various requests as they continue trough their processing lifecycles. In one embodiment, the diagnostic context contains a dye vector which contains a number (e.g. 64) dye flags classified into various categories such as client address, user identity, execute queue name, thread group name, request protocol and the like. The SIP server can populate the dye vector in the diagnostic context by setting the appropriate flags for the SIP message entering the system. For example, a monitor can set the dye vector flag "remote-address" if the originating IP address of the incoming SIP message matches the configured value of the Dye Injection Monitor "remote-address" property. The flag set will then be available for other monitors and be useful to perform dye filtering at the monitor level.

In various embodiments, a set of SIP-specific dye flags can be provided to the instrumentation service. These dye flags can be set when message characteristics satisfy a certain criteria. For purposes of illustration, the following dye flags can be implemented:

| Dye Flag | Criterion | Condition |
| --- | --- | --- |
| PROTOCOL_SIP | Message protocol | Will be set for messages belonging to the SIP protocol |
| SIP_REQ | Request method name | Will be set if the SIP request matches the value of property SIP_REQ |
| SIP_RES | Response status | Will be set if the SIP response matches the value of property SIP_RES |
| SIP_REQURI | Request URI | Will be set if the SIP request's URI matches the value of property SIP_REQURI |
| SIP_ANY_HEADER | Message header | Will be set if the SIP request contains a header that matches the value of property SIP_ANY_HEADER |

In various embodiments, the headers of the various SIP messages can be used to determine message characteristics and to inject dye. The value of the SIP_ANY_HEADER DyeInjection Monitor property can be specified in a general format such as "messageType.headerName=headerValue." In one embodiment, the value of the header can be a regular expression that is dynamically evaluated and matched on the fly. In general, SIP and HTTP are different in that the SIP protocol contains more headers than HTTP; many of these headers are optional and are often used less consistently than standard HTTP protocol headers. Accordingly, the SIP_ANY_HEADER dye flag can be used to perform pattern matching on-the-fly in order to provide the ability for the developer to specify any or all types of headers of the SIP protocol with more freedom and flexibility. In one embodiment, the specific pattern defined for the SIP_ANY_HEADER header can be illustrated as follows: java.util.regex.Pattern.compile("(request|response)(\\.)([\\p{Graph}]+)(\\=)(.)",Pattern.CASE_IN SENSITIVE);. For example, the developer can specify this property as SIP_ANY_HEADER=request.Contact=sip:sipp@localhost:5061 or SIP_ANY_HEADER=request.Contact=sip.findme@172.17.30.50. By implementing the SIP_ANY_HEADER DyeInjection Monitor property in this fashion, the system allows any type of header to be specified, whether it is required, optional or rarely used.

In this manner, dye injection and filtering can provide the advantages of selectively performing diagnostic actions only on requests that match defined criteria, keeping the volume of generated diagnostic information to a manageable level and allowing diagnosis of selected requests without slowing down all other requests in the system.

FIG. 1 is a general illustration of a SIP Server and its components, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP Server 100 is a carrier-class Java Enterprise Edition (J2EE) application server that has been extended with support for the Session Initiation Protocol (SIP) and other operational enhancements that allow it to meet the demanding requirements of next-generation internet protocol (IP) based communications networks. The SIP Server can be used to create, deploy and manage various real-time communications services and applications 102 by telecom operators who wish to provide mobile and fixed multimedia services. As with any Java application server, the SIP server can take advantage of the J2EE Platform Kernel and Services 110 in order to compile, execute and optimize the performance of various programs and applications. In one embodiment, the SIP server 100 is also extended with support for a multitude of standards and protocols such as SIP 112, Diameter 114, Hyper Text Transfer Protocol (HTTP) 116, Lightweight Directory Access Protocol (LDAP) 118, Simple Network Management Protocol (SNMP) 120, Simple Object Access Protocol (SOAP) 122, Java Database Connectivity (JDBC) 124, and others. It should be noted, however, that the embodiments of the present invention are not limited to the specific SIP application server illustrated herein, nor to any particular protocol or programming language.

As shown, the SIP Server 100 is enabled to support session initiation protocol (SIP). SIP is a protocol used primarily for creating and terminating sessions with one or more participants, such as setting up or tearing down voice or video calls. SIP is described in more detail in RFC 3261 of the IETF SIP Working Group, which is incorporated herein by reference.

The SIP protocol specification defines different types of high level SIP roles, namely user agents (UA) which include UA clients, UA servers, and Back-to-Back user agents (B2BUA). The SIP protocol also defines the roles of Proxies, Registrars and Redirect Servers. Accordingly, the SIP Servlet API of the SIP server 100 allows any of these roles to be coded as a SIP Servlet Application. Furthermore, because SIP is an extensible protocol, the API is also designed to allow developers to easily extend functionality. This can be accomplished by dividing up the SIP processing between the container functions and the applications. Most of the base protocol can be performed by the container, leaving the higher level tasks for the applications to perform. This division of processing can lead to a great amount of flexibility to the SIP Servlet API.

Continuing with the illustration, the SIP Server 100 can include an Enterprise Java Bean (EJB) container 104, an HTTP Servlet container 106 and a SIP Servlet container 108.

Each of these containers can provide an environment that supports the execution of applications developed using its corresponding technology. For example, the EJB container 104 manages enterprise beans contained within it, which in turn provide the business logic for a J2EE application. This management can encompass services such as registering, creating and destroying objects and their instances, providing remote interfaces to objects, managing the state of objects, maintaining security, and coordinating distributed transactions. Similarly, the HTTP container 106 and the SIP Servlet container 108 can be responsible for managing HTTP and SIP servlets respectively.

The SIP stack of the SIP Server 100 can be fully integrated into the SIP Servlet container 108 and is more powerful and easier to use than a traditional protocol stack. For example the higher level abstraction of the SIP Servlet API can free the developer from the mechanics of handling of transaction timers, syntactic evaluation of received requests, generation of non application-related responses, generation of fully formed SIP requests from request objects (which may involve correct preparation of system headers and generation of syntactically correct SIP messages) and handling of lower-layer transport protocols such as Transport Control Protocol (TCP), User Datagram Protocol (UDP) and Stream Control Transmission Protocol (SCTP).

In one embodiment, the Servlet container can provide a Shared Session Context 126 and session application programming interface (API) in order to maintain awareness of the state of the larger converged SIP and HTTP application session. There are many use cases where a converged application, using both SIP and HTTP functions, is desirable. Some examples of these applications include conferencing and click-to-call applications, as well as Presence and User Agent Configuration Management applications. The converged applications can also use other protocols (e.g. Diameter) to perform more advanced functions such as modifying subscriber profile data. Furthermore, the container can provide a whole host of other services including distributing request and response objects to components in a structured way as well as managing the end-to-end object lifecycle, including resource, transaction and session state management.

Figure 2:
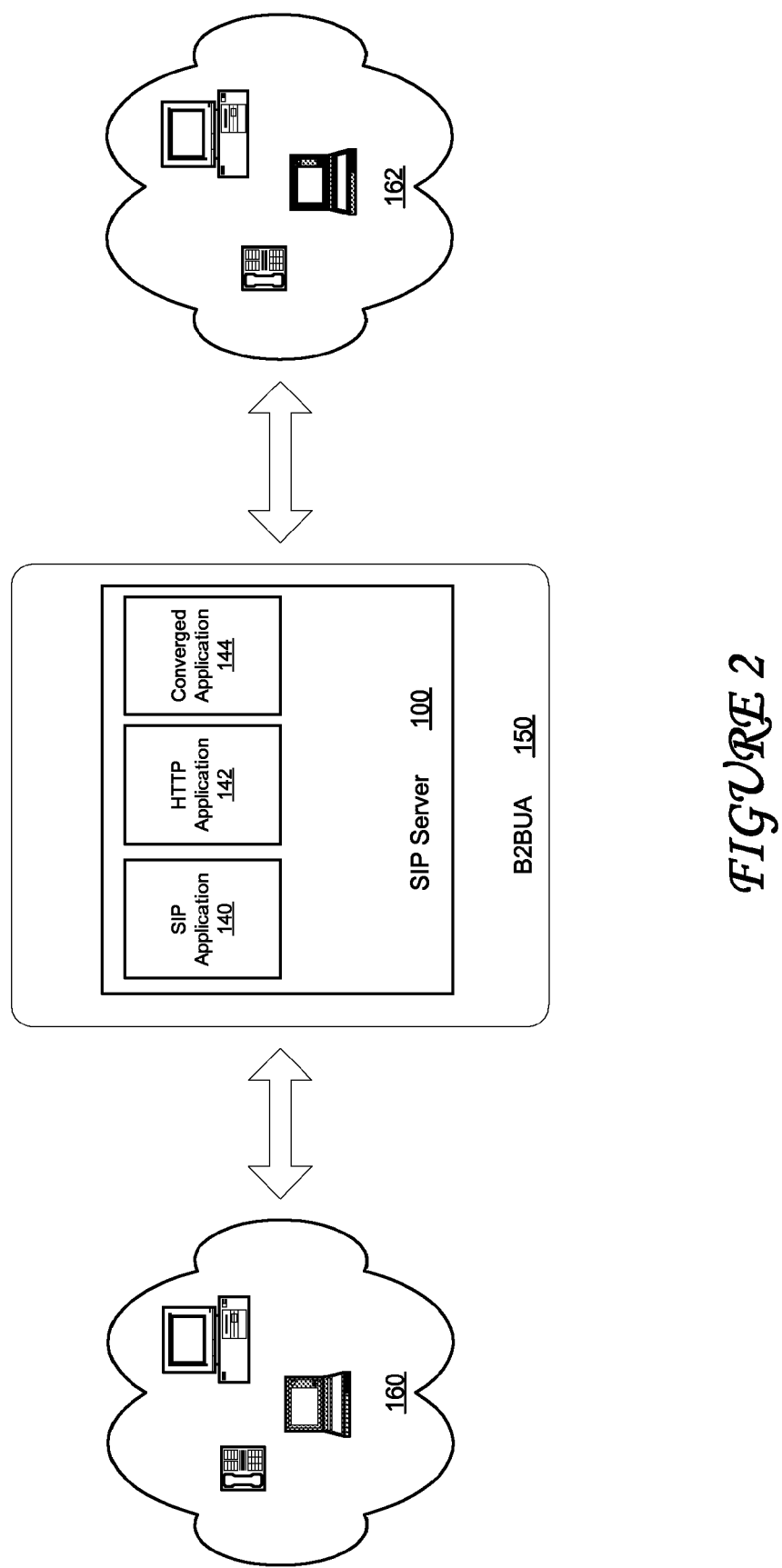
FIG. 2 is an illustration of a possible use of the SIP Server, in accordance with various embodiments.

FIG. 2 is an illustration of a possible use of the SIP Server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In the embodiment illustrated, the SIP server 100, along with the various applications hosted thereon (e.g. 140, 142 and 144), can be used as a back-to-back user agent (B2BUA) 150 in a typical telecommunications environment. A B2BUA can take the place of an intermediary between communications by user agents 160, 162, which may include various cellular phones, wireless devices, laptops, computers, applications, and other components capable of communicating with one another electronically. The B2BUA 150 can provide multiple advantages, such as controlling the flow of communication between user agents, enabling different types of user agents to communicate with one another (e.g. a web application can communicate with a cellular phone), as well as various security advantages. As one illustration, the user agents can transmit to the SIP server instead of communicating directly to each other and thus malicious users can be prevented from sending spam and viruses, hacking into other user agent devices, and otherwise compromising security. It should be noted that the SIP Server 100 need not necessarily take the role of a B2BUA as illustrated in FIG. 2, but can also be used as a proxy, a redirect server, or some other role defined by the SIP protocol.

Figure 3:
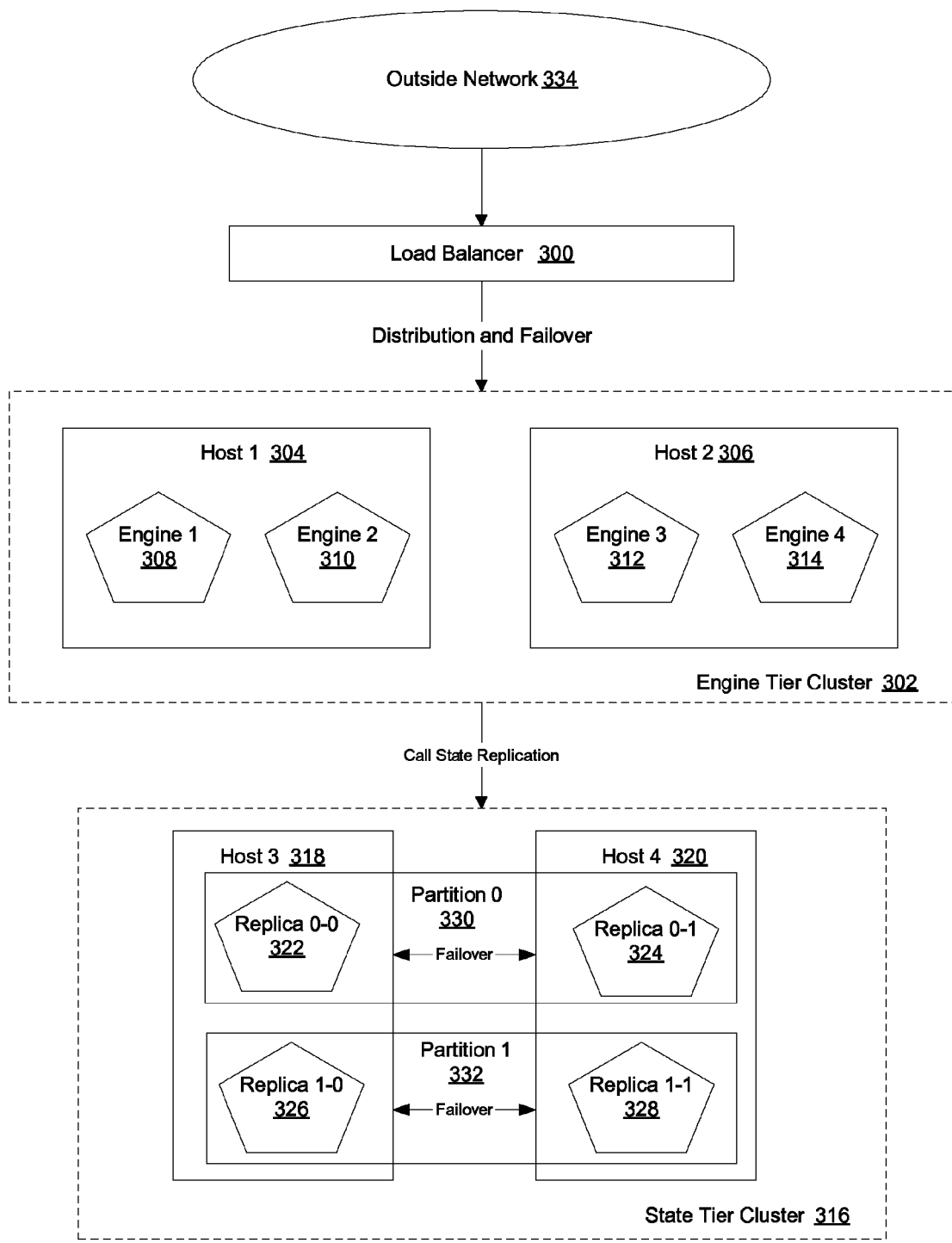
FIG. 3 is an illustration of a tiered architecture of the SIP server deployment, in accordance with various embodiments.

FIG. 3 is an illustration of a tiered architecture of the SIP server deployment, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, various messages, such as phone call requests or other transfers of data associated with the SIP protocol, can come into the cluster from the internet (such as over VoIP), phone, or some other type of outside network 334. This message can be received and handled by a load balancer 300 which can be responsible for distributing message traffic across the engines (i.e. engine 1 308, engine 2 310, engine 3 312 and engine 4 314) in the cluster which handle the processing of the message traffic. The load balancer can be a standard load balancing appliance hardware device and it is not necessary that it be SIP aware; there is no requirement that the load balancer support affinity between the engines and SIP dialogs or transactions. Alternatively, the load balancer can be implemented as software that distributes the messages to the various engines. In the various embodiments, the primary goal of the load balancer 300 can be to provide a single public address that distributes incoming SIP requests to available servers in the SIP server engine tier cluster 302. Such distribution of requests can ensure that the SIP server engines are fully utilized. The load balancer 300 can also be used for performing maintenance activities such as upgrading individual servers or applications without disrupting existing SIP clients.

In the embodiment illustrated, the SIP server can provide a two-tier cluster architecture model to handle the incoming messages. In this model, a stateless engine tier cluster 302 can process all signaling traffic and can also replicate transaction and session state to the state tier cluster 316 which in turn can be divided into multiple partitions. Each partition can consist of any number of nodes (replicas) distributed across any number of hosts such as host 3 318 and host 4 320, which can be implemented as computers linked in a cluster type network environment. For example, partition 0 330 can include state replica 0-0 322 and a state replica 0-1 324 which can maintain copies of the call state information of the partition. The state tier cluster 316 can be an n-way peer-replicated Random Access Memory (RAM) store that maintains various data objects which can be accessed by the engine nodes in the engine tier. In this manner, engines can be provided a dual advantage of faster access to the data objects than retrieving data from a database while at the same time, engines can be freed up from having to store the data onto the engine tier itself. This type of separation can offer various performance improvements. The state tier can also function as a lock manager where call state access follows a simple library book model, (i.e. a call state can be checked out by one SIP engine at a time).

On the other hand, the engine tier cluster 302 can be implemented as a cluster of SIP server instances that hosts the SIP servlets which provide various features to SIP clients. In one embodiment, the engine tier is stateless, meaning that the SIP session state information is not persisted in the engine tier, but is obtained by querying the state tier cluster 316 which can in turn provide replication and failover services for SIP session data.

The primary goal of the engine tier 302 can be to provide maximum throughput combined with low response time to SIP clients. As the number of calls or their duration increases, more server instances can be added to the engine tier to manage the additional load. It should be noted however, that although the engine tier may include many such server instances, it can be managed as a single, logical entity. For example, the SIP servlets can be deployed uniformly to all server instances by targeting the cluster itself and the load balancer need not maintain affinity between SIP clients and individual servers in the engine tier.

In various embodiments, the state tier cluster 316 can be implemented as a cluster of SIP server instances that provides a high-performance, highly-available, in-memory store for maintaining and retrieving session state data for SIP servlets. This session data may be required by SIP applications in the SIP server engine tier 302 in order to process incoming messages. Within the state tier 316, session data can be managed in one or more partitions (e.g. partition 0 330 and partition 1 332), where each partition manages a fixed portion of the concurrent call state. For example, in a system that uses two partitions, the first partition 0 330 could manage one half of the concurrent call state (e.g. A-M) and the second partition 1 332 can manage the other half (e.g. N-Z). With three partitions (not shown), each can manage a third of the call state and so on. Additional partitions can be added as needed to manage large number of concurrent calls or incoming messages.

In one embodiment, within each partition, multiple state servers can be added to provide redundancy and failover should the other servers in the partition fail. When multiple servers participate in the same partition, those servers can be referred to as replicas because each server maintains a duplicate copy of the partition's call state. For example, partition 0 330 can maintain its state information in replica 0-0 322 and replica 0-1 324. In some embodiments, the replicas can be distributed over multiple hosts (e.g. host 3 318 and host 4 320) in order to provide host-to-host failover services in cases where a computer crashes. Furthermore, to increase the capacity of the state tier 316, the data can be split evenly across a set of partitions, as previously discussed. The number of replicas in the partition can be called the replication factor, since it determines the level of redundancy and strength of failover that it provides. For example, if one node goes down or becomes disconnected from the network, any available replica can automatically provide call state data to the engine tier.

Replicas can join and leave the associated partition and each replica can serve as exactly one partition at a time. Thus, in one embodiment, the total available call state storage capacity of the cluster is a summation of the capacities of each partition.

In one embodiment, each partition can be peer-replicated, meaning that clients perform all operations (reads/writes) to all replicas in the partition (wherein the current set of replicas in the partition is called the partition view). This can provide improved latency advantages over more traditional synchronous "primary-secondary" architecture wherein one store acts as a primary and the other nodes serve as secondaries. Latency is reduced because there is no wait for the second hop of primary-secondary systems. The peer-replicated scheme can provide better host-to-host failover characteristics as well, since there does not need to be change propagation delay.

In one embodiment, the engine nodes 308, 310, 312 and 314 which are distributed over multiple hosts 304, 306, can be responsible for executing the call and message processing. Each call can have a call state associated with it. This call state can contain various information associated with the call, such as the ids of the caller/callee, where the caller is, what application is running on the callee, any timer objects that may need to fire in order to process the call flow and the like. The state for each call can be contained in the state tier 316. The engine tier 302, on the other hand, could be stateless in order to achieve the maximum performance. In alternative embodiments, the engine tier can have small amounts of state data stored thereon at selected periods of time.

In one embodiment, a typical message processing flow can involve locking/getting the call state, processing the message and putting/unlocking the call state. The operations supported by the replicas for normal operations can include:
  lock and get call state
  put and unlock call state
  lock and get call states with expired timers As previously discussed, the state tier 316 can maintain call state in various data objects residing in the random access memory (RAM) of a computer. This can provide significant access speed advantages to the engine tier 302. The SIP server can also provide a way for efficiently persisting long-lived state information to a database (disk storage) in order to avoid unnecessary consumption of cluster resources. Since RAM is generally significantly more expensive than database memory, it may be desirable to reduce the number of replicas in the state tier 316 by storing at least some of the session state information to the database. In many cases, database access to data is slower than RAM-based replica access. However, because some SIP communications are not as latency-sensitive as others, these communications can be persisted in the database in order to save the amount of random access memory required by the SIP server deployment. For example, a standard telephone call can be viewed as having three stages—a call setup stage, an active call stage and the call teardown stage (hanging up the call). The call setup stage is typically the most latency-sensitive since users tend to expect immediate results from the server after pressing the call button. However, the call teardown stage may not be as sensitive to latency because after the handset disconnects, it may not matter from the user's perspective how long it will take for the server to complete call termination. As such, session state for call termination can be maintained in a database. Similarly, the active call stage may also be not as latency-sensitive as the call setup stage since it mostly involves communication of voice bits between media servers. It should be noted that this example of a telephone call is provided purely for purposes of illustration and is not intended to limit the invention.

Figure 4:
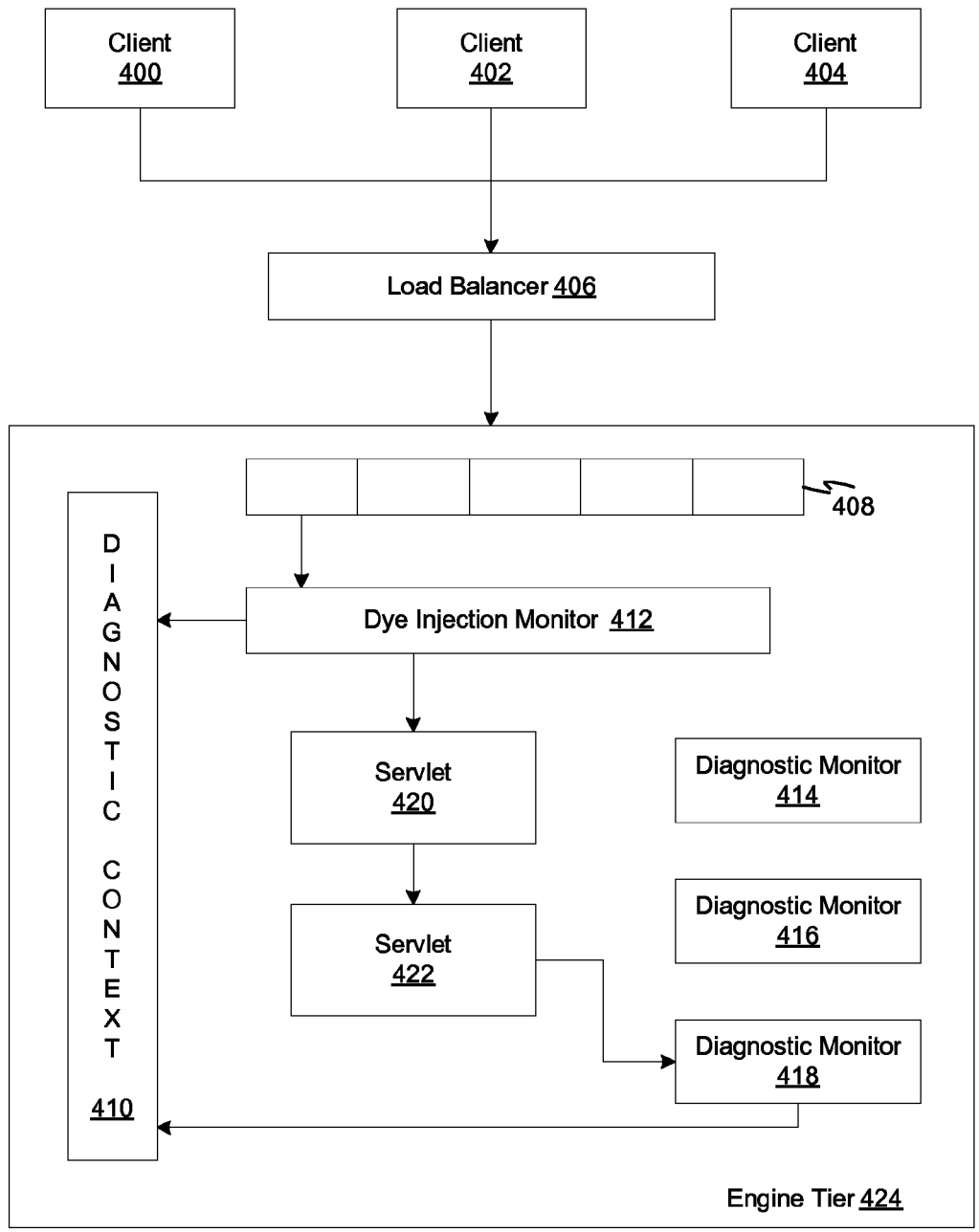
FIG. 4 is an illustration of a diagnostic instrumentation service residing on a SIP server, in accordance with various embodiments.

FIG. 4 is an illustration of a diagnostic instrumentation service residing on a SIP server, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, incoming message traffic from a plurality of clients 400, 402, 404 can be received at the load balancer 406 and distributed to a selected server at the engine tier 424. At the server, the incoming request can be placed into a call-level queue 408 which is serviced by a thread assigned to it. In one embodiment, the queue 408 contains all messages associated with a particular call or session such that a single thread can process one or more messages associated with the call.

Upon reading each message from the queue, a dye injection monitor 412 can inject dye into the message before passing the message to one of the servlets or applications 420, 422 for processing. In one embodiment, the dye injection monitor can set the appropriate dye flags on the diagnostic context 410 based on its configuration properties and the corresponding message characteristics. In one embodiment, the diagnostic context includes a dye vector which contains 64 (or some other number of) flags and the SIP server can populate the dye vector by setting the dye flags for SIP messages entering the system.

Once the dye is injected, the message can be passed to one or more servlets for processing. In one embodiment, servlet 420 is the first servlet to process the message and servlet 422 is the next servlet which processes the message after servlet 420. In various embodiments, dye filtering is performed at the servlet or application processing layer. For example, upon calling a method within the SIP servlet, one or more of the diagnostic monitors 414, 416, 418 whose dye-masks match the set dye vector flags can be invoked. As the SIP message flows through the applications, only those monitors whose dye masks match the dye flags in the Diagnostic Context will be invoked, thus providing filtering of diagnostic events. As shown in the figure, diagnostic monitor 418 is invoked during the processing of the message by servlet 422.

The diagnostic monitors can then perform a particular diagnostic activity, that is either a fixed action or an action configurable by the developer/administrator. As a nonlimiting illustration, the monitor 418 can dump the thread and log information associated with the processing into a file. Obviously, other diagnostic actions are possible, and the present disclosure is not intended to be limited to any such specific activity.

Once the diagnostic action is performed and the servlet processing is complete, the thread can reset the flags in the diagnostic context and either be returned to the thread pool or be assigned to process the next message in the queue 408. This resetting of the dye flags can be preferable so that the next request to be processed does not have the same dye injected into it by virtue of following the first request. If the thread is returned to the pool immediately, the diagnostic context can be reset at that time. Alternatively, if the thread is to process some other request, the diagnostic context can be reset just prior to assigning the thread to the next request in the queue.

In certain embodiments, request processing in the SIP server differs from HTTP request processing in typical application servers. For example, in some HTTP-based application servers, each incoming request is processed by a different thread that is obtained from a queue of threads maintained by the server. After processing the request, the thread is returned to the queue of idle threads so that it can be assigned again later to handle a different (often unrelated) request. In one SIP server embodiment, however, more than one incoming call can be processed by a single thread before being returned to the thread queue (or thread pool). For example, all incoming messages belonging to the same call can be buffered into the call-level queue and a single thread can be assigned to process some or all of the messages in that queue. Thus, upon completing the processing of one request, the thread can continue processing the next request in the queue and so on. This can be done for efficiency purposes so that call state information need not be read/written to the state tier upon completing the processing for one message. Since some of the state data for the current message can be used to process the next message in the same call, it may be disadvantageous to retrieve the data from the state tier upon every message. Thus, by allowing the same thread to process the next message, the number of hits to the state tier can be reduced, thereby improving latency and efficiency of the system.

Figure 5:
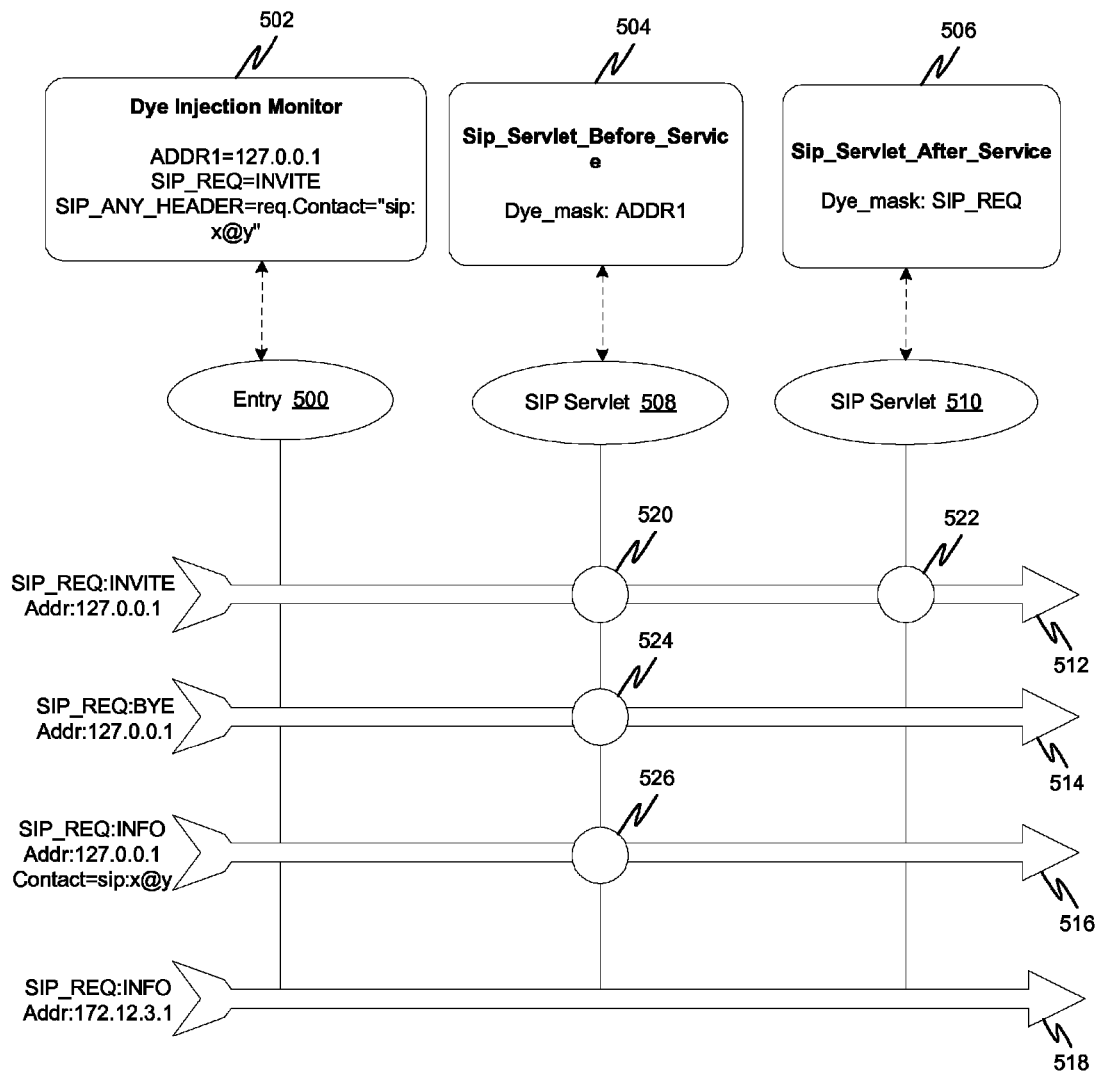
FIG. 5 is an illustration of dye injection and filtering of SIP messages, in accordance with various embodiments.

FIG. 5 is an illustration of dye injection and filtering of diagnostic activity, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, various SIP messages 512, 514, 516, 518 can be received and processed by the SIP application server. At entry 500 to the system, each incoming message can be inspected by the dye injection monitor 502 and if the message characteristics match the configuration of the dye injection monitor, appropriate flags can be set on the diagnostic context. For example, in the illustration shown, the DyeInjection monitor is configured to inspect messages based on the address of the sender, the sip request and the SIP_ANY_HEADER property.

Once a message is received and inspected, the dye injection monitor can inject the appropriate dye based on the properties configured in the DyeInjection monitor. As shown, message 512 comes from address 127.0.0.1 and it is a SIP INVITE request. As the values of the properties configured in the DyeInjection monitor—ADDR1 And SIP_REQ—match the corresponding characteristics in the SIP message, the DyeInjection monitor can set the appropriate dye flags, namely ADDR1 and SIP_REQ in the Diagnostic Context of this particular message 512.

Once, the dye flags are set, the message 512 can flow into the SIP container wherein it will be processed by one or more SIP applications. For example, SIP Servlet 508 can be the first application to process the message and this servlet can have a diagnostic monitor SIP_SERVLET_BEFORE_SERVICE configured with the dye mask ADDR1. Thus, while processing the message 512, the diagnostic monitor SIP_SERVLET_BEFORE_SERVICE will fire an event 520 and perform the action specified for it, such as a trace action. A different application such as SIP Servlet 510 can have a different diagnostic monitor, namely SIP_SERVLET_AFTER_SERVICE configured with the dye mask SIP_REQ and this monitor will be invoked once the message 512 is processed by servlet 510. This monitor invocation can cause another event 522 to fire and the configured action(s) to be performed. The SIP_SERVLET_AFTER_SERVICE monitor is invoked because it's dye-mask SIP_REQ is found to be set in the Diagnostic Context of the incoming INVITE request.

In various embodiments, different messages will have different characteristics and consequently different dye flags can be set for each message upon entry. As shown, message 514 can come from the same address 127.0.0.1 but it is a BYE request (i.e., SIP_REQ="BYE") and accordingly, only the dye flag ADDR1 will be set for message 514. Accordingly, only event 524 will fire since the dye mask of the diagnostic monitor for servlet 510 will not find its corresponding dye flag set. Similarly, message 516 comes from IP address 127.0.0.1 and appropriately the event 526 will fire based on the flag ADDR1 being set in the Diagnostic Context. Furthermore, message 516 has a header with value Contact=sip:x@y and as such, the dye injection monitor will set the SIP_ANY_HEADER flag on the diagnostic context since the value of that header matches the value that is specified in the monitor's configuration settings. This SIP_ANY_HEADER flag can be used to specify, dynamically evaluate and pattern match headers of incoming messages such that the header values can be specified by generic expressions. Thus, after the dye injection monitor sets the SIP_ANY_HEADER flag, an appropriate diagnostic monitor can be invoked which matches this flag, such as during processing of the message by a third application (not shown).

In many instances, the majority of message traffic can be ignored, (i.e. no dye flags set) so as not to slow down the system. For example, for message 518 no dye flags will be set because this message does not fit the characteristics being filtered by the instrumentation service. Accordingly, no events will be fired during its processing and the system will not be burdened with extra resources and time needed to obtain diagnostics information regarding this message.

Figure 6:
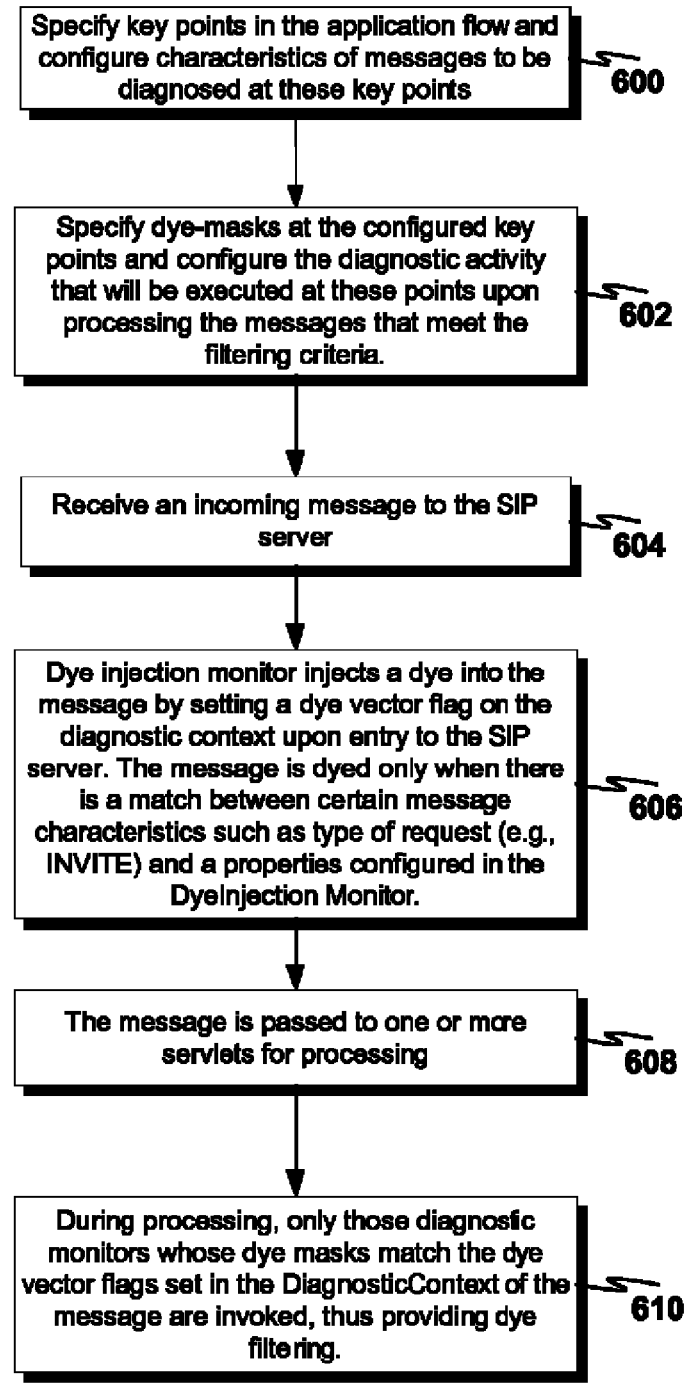
FIG. 6 is a general flow chart diagram of the instrumentation using dye injection and filtering process, in accordance with various embodiments.

FIG. 6 is a general flow chart diagram of the instrumentation system using dye injection and filtering process, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown, a user can specify key points in the SIP server application flow and specific types of messages to be monitored at these key points 600. In various embodiments, the types of messages can be based on certain message characteristics, such as which IP address the message is transmitted from and the like. One or more diagnostic activities can also be specified, which will be executed at the key points upon processing the specified types of messages 602. For example, one diagnostic monitor can be configured to perform a stack dump while another may log data into a log file. Various other actions are also possible.

In step 604, a message is received to the SIP server during the regular processing of messages by the system. The message is inspected and the dye injection monitor can inject a dye into the message by setting flags in a dye vector on the diagnostic context upon entry to the SIP server 606. The dye injection can be performed prior to passing the request to the SIP container for processing 608.

During processing, the diagnostic activity can be filtered by invoking only those diagnostic monitors whose dye masks match the dye vector flags in the Diagnostic Context of the message 610. For example, an application may have a diagnostic monitor associated therewith, which is invoked upon finding its dye mask set in the Diagnostic Context in step 606. The diagnostic monitor can then perform the actions specified in step 602.

Figure 7:
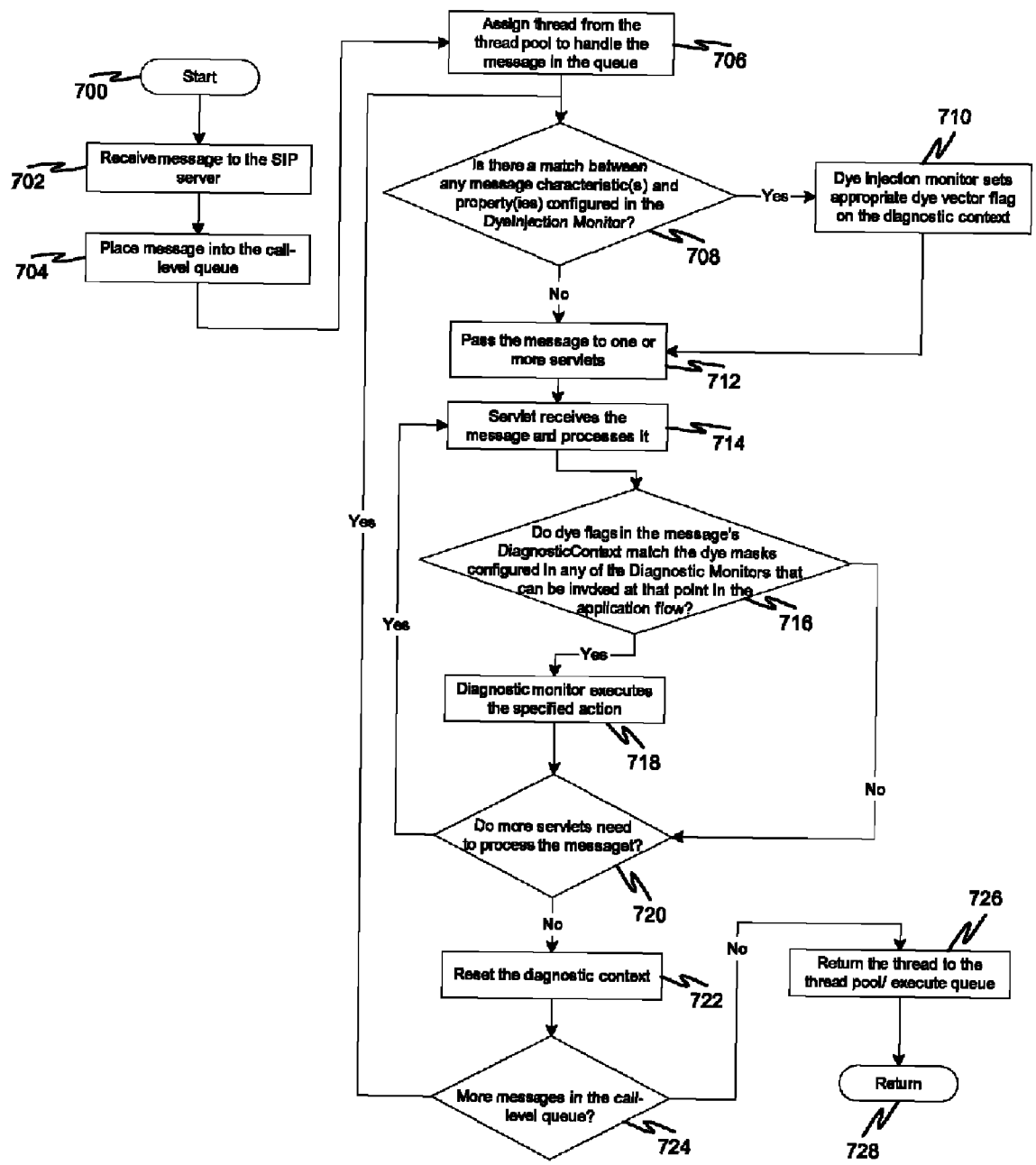
FIG. 7 is a flow chart diagram of instrumentation using dye injection and filtering process, in accordance with various embodiments.

FIG. 7 is a flow chart diagram of instrumentation using dye injection and filtering process, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, the process can begin in step 700. In step 702, a message is received to the SIP server. Once received, the message can be placed into a call-level queue 704 to be processed by a SIP server engine node. At any given point in time, there can be a single or multiple messages in the queue associated with the call. In step 706, a thread from the thread pool (or execute queue) is assigned to process the message in the queue.

In step 708, the dye injection monitor can determine, based on its configuration data and the characteristics of the message, whether dye should be injected into the message assigned to this thread. If it is determined that dye should be injected, the dye injection monitor can set the dye flags on the diagnostic context in step 710. If no dye needs to be injected, the process can continue to step 712.

In step 712, the message is passed from the dye injection monitor to one or more applications (e.g. servlets) that can be responsible for processing the request. In one embodiment, if there are multiple servlets, they can process the message sequentially.

In step 714, the servlet receives the message and begins the processing. Processing the message can involve a multitude of various actions, including but not limited to setting or getting attributes from sessions, creating/invalidating sessions, processing messages (in methods like doInvite/doSuccessResponse etc.) and transmitting messages. In step 716, during the processing of the message by the servlet, it can be determined if dye-masks for any configured diagnostic monitor(s) are set in the dye vector flags previously set by the dye injection monitor. If one or more such monitors are found, in step 718, the matching diagnostic monitor(s) is invoked. In one embodiment, the invocation of the diagnostic monitor includes executing the diagnostic action specified in its configuration settings. For example, the diagnostic action can be used to gather relevant data associated with the message/call and to present it to the user in a logical manner. In one embodiment, a specified diagnostic action is executed before a particular method invocation of the servlet (e.g. invite( ) method) and an action is executed after that method's invocation. The information gathered by the two actions can then be compared in order to gather diagnostic data or detect any bugs/errors which may have been caused by the particular method's invocation. In other words, two snapshots can be analyzed in order to compare the before and after status of the system to see the effect of a method call.

Once processing is completed by the servlet, the thread can determine whether any further servlets will need to process the message 720. If there are additional servlets, steps 714, 716, and 718 can be performed for each such servlet. Once all of the servlets necessary to complete the server-side processing of the message are invoked, the process can continue to step 722.

In step 722, the thread can reset the diagnostic context. In some embodiments, this is preferable in order to clear any dye flags which have been set on the diagnostic context prior to continuing to process additional messages. In most instances, it is undesirable that the dye flags remain set for the next message in the queue since this would invoke the corresponding diagnostic monitors which may not be intended. Accordingly, the thread can reset the context once all of the servlets have finished processing the message.

In step 724, it can be determined whether any more messages are in the call-level queue, which have not been assigned to a thread. If no more messages are in the queue, the thread can be returned to the thread pool and become idle in the system 726 at which point the process illustrated in the figure is complete 728. If there are more messages to be processed in the call-level queue, the same thread can be assigned to process the next message in the queue. In various embodiments, this is performed for efficiency purposes, such as in order to reduce any unnecessary time and resources needed to read/write state information associated with the call. Thus, the thread can process the next message in a similar manner, by performing steps 708 through 722 for the next message in the queue.

In various embodiments, the instrumentation service can also provide dye injection and filtering for outgoing messages transmitted by the SIP server. In SIP, unlike HTTP, many network components often have the ability to take on a role of being both the client and the server for the same call/session. Thus, for example, the SIP server can not only receive messages and transmit responses, but also can initiate transmission of messages to other network components or receive responses from them during the call. As an illustration, if a call is established between two clients and one client is on a calling card that runs out of money, the SIP server can send an out-of-bounds interrupt message, terminating the session between the two clients. In one embodiment, the interrupt signal could be a "BYE" SIP request initiated by the SIP application server. This sort of signaling is not usually performed in HTTP programming since HTTP usually involves a simple request/response type of communication between the client and the server which behave as such for the duration of the session.

Such signaling functionality makes it advantageous to provide the ability for the SIP server to monitor outbound messages in addition to the incoming messages previously discussed. As one use case, if an incoming request is received at an incorrect proxy server, that proxy server may initiate a transmission to forward the request to the correct SIP server that is responsible for processing the message. In some instances, it may be advantageous to monitor such outgoing transmissions in order to determine the path of the message transmission, detect errors or otherwise monitor communications between network components. The ability to inject dye into selected outgoing messages and perform diagnostic actions upon the transmission of such messages is illustrated in FIG. 8 below.

Figure 8:
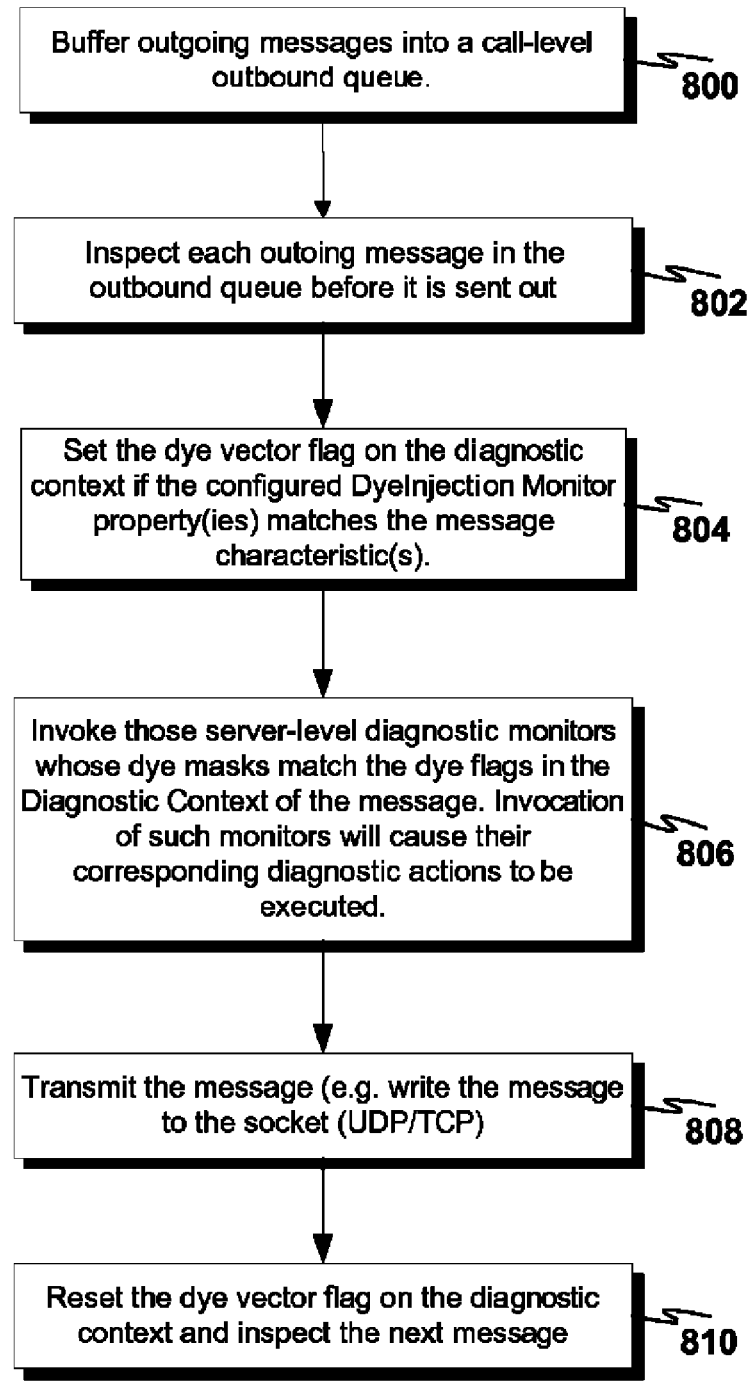
FIG. 8 is a flow chart diagram of instrumentation using dye injection for outbound messages, in accordance with various embodiments.

FIG. 8 is a flow chart diagram of instrumentation using dye injection for outbound messages, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

Besides incoming messages, dye injection can also be used on server-level instrumentation monitors on outgoing messages. In certain embodiments, the SIP server can buffer outgoing messages into a call-level outbound queue 800 while the call state is locked. These buffered messages can be flushed when the call state is saved and unlocked.

As illustrated, each outgoing message in the queue can be inspected in step 802 before being sent out. In step 804, the dye vector flags are set on the diagnostic context. The server-level diagnostic monitors whose dye masks match these dye vector flags are invoked and they can perform the diagnostic actions that have been configured, as shown in step 806. In step 808, the message is transmitted by the server, such as by writing the SIP message to the socket via UDP/TCP. Subsequently, the diagnostic context can be reset and the next message in the outbound queue can be inspected in step 810.

This process can allow dye injection to be used with outgoing messages. Since in some cases, the SIP server behaves as a client (e.g. initiates requests, etc.) it can often be advantageous to capture these events and perform diagnostic actions associated therewith. The dye injection feature can allow this functionality to be provided to the server, in addition to the instrumentation of incoming messages, as described above.

Various embodiments previously discussed include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for providing an instrumentation service that adds diagnostic code to session initiation protocol (SIP) software applications, said method comprising:
   providing a set of SIP-specific dye flags on the instrumentation service of a SIP server, wherein at least one of the set of SIP-specific dye flags includes a property to specify any header of the SIP protocol by using a generic expression;
   receiving a SIP message by a thread at the SIP server;
   setting the at least one of said SIP-specific dye flags on a diagnostic context associated with the SIP message by using the generic expression to specify the header of said SIP message; and
   comparing said SIP-specific dye flag injected into the SIP message to dye masks configured on Diagnostic Monitors to provide filtering of diagnostic activity;
   executing a diagnostic action upon determining that the SIP-specific dye flag on the SIP message matches the dye mask that is configured on the diagnostic monitor; and
   re-setting the dye flag on said diagnostic context by the thread for any subsequent request processing.

2. The method of claim 1, further comprising:
   maintaining a call-level queue at the SIP server that temporarily stores incoming SIP messages; and
   assigning a single thread to process a first SIP message and a second SIP message sequentially from said call-level queue wherein said single thread invokes the dye injection monitor and the diagnostic monitor for each of said first request and said second request.

3. The method of claim 1, wherein said diagnostic context contains metadata regarding each said SIP message that specifies the SIP specific dye flag of each SIP incoming message.

4. The method of claim 1 wherein executing the diagnostic action further includes:
   executing a first diagnostic action that collects data prior to invocation of a method; and
   executing a second diagnostic action that collects data subsequent to invocation of said method; and
   comparing the data collected prior to invocation of the method with the data collected subsequent to invocation of said method in order to determine an effect of said method.

5. The method of claim 1, further comprising:
   buffering, into an outbound queue, one or more outgoing SIP messages to be transmitted by the SIP server and injecting dye into said outgoing SIP messages; and
   inspecting said outgoing SIP messages prior to transmission and performing a diagnostic action if the dye mask pattern matches said dye of the outgoing SIP messages.

6. The method of claim 1 wherein said dye flag on the SIP message includes at least one of:
   a message protocol dye flag, a request method name dye flag, a response status dye flag, a request uniform resource indicator (URI) dye flag and a request header dye flag.

7. The method of claim 1, further comprising:
   receiving configuration settings that specify a pointcut in said a SIP servlet for adding diagnostic code.

8. The method of claim 1, further comprising:
   receiving configuration settings at the SIP server, which specify the Dye Injection Monitor configuration and the diagnostic action to be performed upon matching said SIP-specific dye flag associated with the SIP message to the dye mask.

9. The method of claim 1 wherein the diagnostic action includes at least one of:
   a trace action, a display arguments action, a trace elapsed time action, a stack dump action and a thread dump action.

10. A computer readable storage medium storing one or more sequences of instructions for providing an instrumentation service, which instructions, when executed by one or more processors, cause the one or more processors to carry out the steps of:
    providing a set of SIP-specific dye flags on the instrumentation service of a SIP server, wherein at least one of the set of SIP-specific dye flags includes a property to specify any header of the SIP protocol by using a generic expression;
    receiving a SIP message by a thread at the SIP server;
    setting the at least one of said SIP-specific dye flags on a diagnostic context associated with the SIP message by using the generic expression to specify the header of said SIP message; and
    comparing said SIP-specific dye flag injected into the SIP message to dye masks configured on Diagnostic Monitors to provide filtering of diagnostic activity;
    executing a diagnostic action upon determining that the SIP-specific dye flag on the SIP message matches the dye mask that is configured on the diagnostic monitor; and
    re-setting the dye flag on said diagnostic context by the thread for any subsequent request processing.

11. A system for providing an instrumentation service that adds diagnostic code to session initiation protocol (SIP) software applications, said method comprising:
    one or more processors and physical storage memory encoded with instructions that are executed by the one or more processors to perform the steps of
    providing a set of SIP-specific dye flags on the instrumentation service of a SIP server, wherein at least one of the set of SIP-specific dye flags includes a property to specify any header of the SIP protocol by using a generic expression;
    receiving a SIP message by a thread at the SIP server;
    setting the at least one of said SIP-specific dye flags on a diagnostic context associated with the SIP message by using the generic expression to specify the header of said SIP message; and
    comparing said SIP-specific dye flag injected into the SIP message to dye masks configured on Diagnostic Monitors to provide filtering of diagnostic activity;
    executing a diagnostic action upon determining that the SIP-specific dye flag on the SIP message matches the dye mask that is configured on the diagnostic monitor; and
    re-setting the dye flag on said diagnostic context by the thread for any subsequent request processing.

12. The system of claim 11, wherein the physical storage memory is further encoded with instructions for:
    maintaining a call-level queue at the SIP server that temporarily stores incoming SIP messages; and
    assigning a single thread to process a first SIP message and a second SIP message sequentially from said call-level queue wherein said single thread invokes the dye injection monitor and the diagnostic monitor for each of said first request and said second request.

13. The system of claim 11, wherein said diagnostic context contains metadata regarding each said SIP message that specifies the SIP specific dye flag of each SIP incoming message.

14. The system of claim 11 wherein executing the diagnostic action further includes:
   executing a first diagnostic action that collects data prior to invocation of a method; and
   executing a second diagnostic action that collects data subsequent to invocation of said method; and
   comparing the data collected prior to invocation of the method with the data collected subsequent to invocation of said method in order to determine an effect of said method.

15. The system of claim 11, wherein the physical storage memory is further encoded with instructions for:
   buffering, into an outbound queue, one or more outgoing SIP messages to be transmitted by the SIP server and injecting dye into said outgoing SIP messages; and
   inspecting said outgoing SIP messages prior to transmission and performing a diagnostic action if the dye mask pattern matches said dye of the outgoing SIP messages.

16. The system of claim 11 wherein said dye flag on the SIP message includes at least one of:
   a message protocol dye flag, a request method name dye flag, a response status dye flag, a request uniform resource indicator (URI) dye flag and a request header dye flag.

17. The system of claim 11, wherein the physical storage memory is further encoded with instructions for:
   receiving configuration settings that specify a pointcut in said SIP servlet(s) for adding diagnostic code.

18. The system of claim 11, wherein the physical storage memory is further encoded with instructions for:
   receiving configuration settings at the SIP server, which specify the Dye Injection Monitor configuration and the diagnostic action to be performed upon matching said SIP-specific dye flag associated with the SIP message to the dye mask.

19. The system of claim 11 wherein the diagnostic action includes at least one of:
   a trace action, a display arguments action, a trace elapsed time action, a stack dump action and a thread dump action.

* * * * *

UNITED STATES PATENT AND TRADEMARK OFFICE
CERTIFICATE OF CORRECTION

PATENT NO.       : 7,895,475 B2
APPLICATION NO.  : 11/943925
DATED            : February 22, 2011
INVENTOR(S)      : Kulkarni et al.

Page 1 of 1

It is certified that error appears in the above-identified patent and that said Letters Patent is hereby corrected as shown below:

In the Drawings

On sheet 7 of 8, in figure 7, Reference Numeral 720, line 2, delete "messaget?" and insert -- message? --, therefor.

On sheet 8 of 8, in figure 8, Reference Numeral 802, line 1, delete "outoing" and insert -- outgoing --, therefor.

In column 1, line 30, delete "2006;" and insert -- 2006. --, therefor.

In column 5, line 5, delete "trough" and insert -- through --, therefor.

In column 12, line 48, delete "And" and insert -- and --, therefor.

Signed and Sealed this
Fourth Day of October, 2011

David J. Kappos
*Director of the United States Patent and Trademark Office*